United States Patent
Yip et al.

(10) Patent No.: US 8,572,356 B2
(45) Date of Patent: Oct. 29, 2013

(54) SPACE-EFFICIENT MECHANISM TO SUPPORT ADDITIONAL SCOUTING IN A PROCESSOR USING CHECKPOINTS

(75) Inventors: Sherman H. Yip, Sunnyvale, CA (US); Paul Caprioli, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 926 days.

(21) Appl. No.: 12/652,641

(22) Filed: Jan. 5, 2010

(65) Prior Publication Data

US 2011/0167243 A1    Jul. 7, 2011

(51) Int. Cl.
*G06F 9/00*    (2006.01)

(52) U.S. Cl.
USPC .......................................... 712/225; 712/207

(58) Field of Classification Search
None
See application file for complete search history.

(56) References Cited

U.S. PATENT DOCUMENTS

| | | | |
|---|---|---|---|
| 7,213,133 B2 | 5/2007 | Caprioli | |
| 7,216,219 B2 | 5/2007 | Chaudhry | |
| 7,263,603 B2 | 8/2007 | Chaudhry | |
| 7,571,304 B2 | 8/2009 | Chaudhry | |
| 2004/0133769 A1* | 7/2004 | Chaudhry et al. | 712/233 |
| 2006/0212688 A1* | 9/2006 | Chaudhry et al. | 712/228 |
| 2007/0226472 A1 | 9/2007 | Chaudhry | |
| 2007/0271565 A1 | 11/2007 | Tirumalai | |
| 2008/0141268 A1 | 6/2008 | Tirumalai | |
| 2008/0172548 A1 | 7/2008 | Caprioli | |

* cited by examiner

*Primary Examiner* — Andrew Caldwell
*Assistant Examiner* — Benjamin Geib

(57) ABSTRACT

Techniques and structures are disclosed for a processor supporting checkpointing to operate effectively in scouting mode while a maximum number of supported checkpoints are active. Operation in scouting mode may include using bypass logic and a set of register storage locations to store and/or forward in-flight instruction results that were calculated during scouting mode. These forwarded results may be used during scouting mode to calculate memory load addresses for yet other in-flight instructions, and the processor may accordingly cause data to be prefetched from these calculated memory load addresses. The set of register storage locations may comprise a working register file or an active portion of a multiported register file.

20 Claims, 11 Drawing Sheets

500 ⇘

Register Storage Locations 501     (Working Register File)

| | Register Identity 510 | Thread 512 | Working Value 514 | Youngest Bit 516 |
|---|---|---|---|---|
| 531 | Reg 0 | 0 | 0 | 1 |
| 532 | Reg 3 | 1 | 300 | 0 |
| 533 | Reg 3 | 1 | 299 | 1 |
| | . | . | . | . |
| | . | . | . | . |
| | . | . | . | . |

Entries 530

Register Storage Locations 551     (Multiport Active Cell)

| | Committed Value 560 | Thread 562 | Working Value 564 |
|---|---|---|---|
| fReg 0 | 3.14159265 | 0 | 3.1 |
| fReg 1 | . | . | . |
| . | . | . | . |
| fReg N-1 | . | . | . |
| . | . | . | . |
| . | . | . | . |
| . | . | . | . |
| fReg 4N-1 | 2.718281 | 3 | 1.0 |

Entries 580

FIG. 5B

SPACE-EFFICIENT MECHANISM TO SUPPORT ADDITIONAL SCOUTING IN A PROCESSOR USING CHECKPOINTS

BACKGROUND OF THE INVENTION

1. Field of the Invention

This invention relates generally to computer processors, and more specifically to processors that implement checkpointing.

2. Description of the Related Art

A modern processor may support taking one or more checkpoints, each of which may include saving an architectural state of the processor at a given time with respect to a program (or program thread) being executed. See, e.g., U.S. Pat. No. 7,571,304, which is incorporated by reference herein in its entirety. As but one example, a checkpoint might be taken by a processor that predicts an instruction stream to take one instruction path upon encountering a branch instruction (i.e., as opposed to taking another instruction path). Accordingly, upon determining that the branch has been mispredicted, execution could be rolled back to the checkpoint, including by using the saved architectural state associated with the checkpoint.

In certain processors, multiple checkpoints may be active at a given time, advantageously resulting in increased processor throughput. Supporting this ability to take multiple checkpoints, however, may require a non-trivial amount of processor real estate, particularly for processors that support a large number of architected registers.

SUMMARY

Techniques and structures are disclosed herein that allow a processor supporting N checkpoints to operate effectively in scouting mode while N checkpoints of the processor are active (i.e., in use). Scouting mode operation may include the processor using a set of register storage locations and/or bypass logic to store results of in-flight instructions, and then using those stored results to pre-fetch data from memory, thus possibly resulting in lower program execution times.

In one embodiment, an apparatus comprising a processor is disclosed, in which the processor includes an execution pipeline and one or more sets of checkpoint storage locations configured to store state information associated with up to N checkpoints (wherein N is at least one). Each of the N checkpoints may be taken by the processor in response to detecting a corresponding checkpoint condition. The processor may be configured, in response to detecting a checkpoint condition when there are N active checkpoints, to execute instructions in scouting mode.

In another embodiment, a method is disclosed for a processor to execute an instruction stream in scouting mode in response to detecting a checkpoint condition at a time that N sets of checkpoint storage locations are being used to store state information associated with N active checkpoints taken by the processor, wherein N is at least one. The processor may be configured, using the N sets of checkpoint storage locations plus some other location(s) (such as another copy of an architected register file) to support a maximum of N+1 checkpoints.

In another embodiment, an apparatus is disclosed, comprising one or more sets of checkpoint storage locations configured to store information associated with up to N checkpoints taken by the apparatus, wherein N is at least one. The apparatus may also comprise an architected register file configured to store results of committed instructions, and a set of register storage locations configured to store results of in-flight instructions. The apparatus may be configured, in response to the apparatus detecting a checkpoint condition when the one or more sets of checkpoint storage locations are storing N active checkpoints, to operate in scouting mode, where scouting mode includes storing, in the architectural register file, information specifying a state of the processor, wherein the stored state is usable to resume execution at the checkpoint condition, and where scouting mode also includes using results in the set of register storage locations as operands for instructions that occur subsequent in program order to the checkpoint condition.

BRIEF DESCRIPTION OF THE DRAWINGS

The following detailed description makes reference to the accompanying drawings, which are now briefly described.

FIGS. 5A-5B are block diagrams of two embodiments of register storage locations 350.

DETAILED DESCRIPTION

Figure 1:
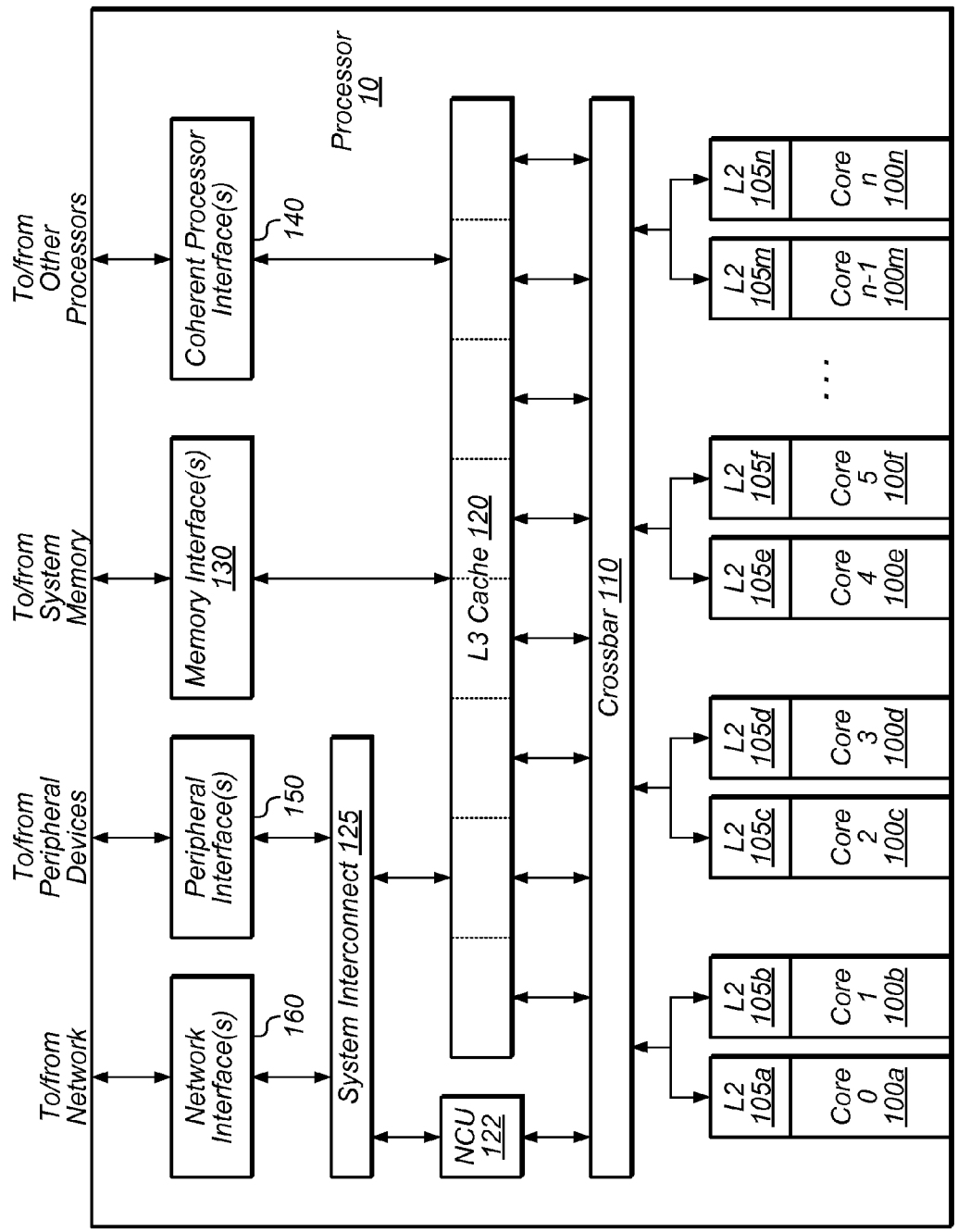
FIG. 1 is a block diagram illustrating an embodiment of a processor core 10.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner in one or more embodiments.

This specification includes references to a "first" and a "second" of, e.g., structures, objects, steps, etc. The use of the term "first" to describe something may simply be a descriptor used for purposes of identification, and does not necessarily imply that a "first" thing comes before or bears a special relationship to a "second" thing (although in some circumstances, this may be the case). Use of the terms "may" and "may not" within this specification is permissive rather than restrictive; that is, something that "may" or "may not" occur is something that might (or might not) occur in some embodiments, rather than something that must (or must not) occur in some embodiments.

In executing a computer program, program order must generally be followed in order to ensure correct results. Thus, when a first instruction is followed by a second instruction that depends on the first instruction's result, the execution of the second instruction is not completed until the first instruction's result becomes available. Sometimes a result will be available almost immediately. Other times, a result may take hundreds of processor cycles to become available—for example, in the case of a memory load that misses a data cache (e.g., an L1 cache) and must retrieve the desired data from elsewhere in the memory hierarchy (e.g., an L2 cache, main memory, etc.). One option in response to a lengthy delay in obtaining results (e.g., a memory cache miss) is to stall. Another option is to perform "scouting" (i.e., to operate in a scouting mode).

As used herein, "scouting" refers to executing instructions without committing them in order to cause instructions that would otherwise result in a cache miss to prefetch data. In one embodiment, scouting may be performed in response to detecting a checkpoint condition; accordingly, when the checkpoint condition is resolved, one or more instructions that would have otherwise have caused a cache miss may already be prefetched. Scouting mode may be employed to boost a processor's performance by reducing total execution time. Consider a situation in which a first memory load instruction misses the cache. The data in question comes back after a relatively long delay. Upon resuming execution, a second instruction also causes a cache miss. By scouting, the processor can cause the servicing of the cache miss of the second instruction to already be in process, allowing the processor to service multiple cache misses with a shorter delay than servicing each miss in sequence (i.e., taking the full cache miss penalty for each miss). Execution in scouting mode thus involves the processor attempting to circumvent or reduce future stalls (e.g., those caused by future memory load instructions).

As an illustrative example, consider the following hypothetical instruction sequence:

| | |
|---|---|
| I201 | LOAD [Address1], Reg1 |
| I202 | ADD Reg1, Reg2, Reg3 |
| I203 | LOAD [Address2], Reg2 |
| I204 | ADD Reg5, Reg6, Reg7 |

The first instruction (I201) is an instruction to load a value from memory into a register Reg1. The next instruction in program order, I202, uses Reg1 as an operand and cannot be properly completed until a value for Reg1 becomes available. If I201 misses the cache, a delay might ensue while data is accessed. After this delay, and when Reg1 becomes available, I202 can be executed. But the next instruction I203 may also miss the cache, immediately causing another lengthy stall.

In a situation in which instruction I201 causes a cache miss, a "checkpoint" may be taken. As used herein, a "checkpoint" refers to the information that preserves a state of the processor (and may include values for all architected registers specified by an instruction set). As used herein, the term "active" in the context of the phrase "active checkpoint" indicates that a checkpoint storage location is actively in use (as opposed to being empty, invalid, or otherwise not in use.) As used herein, taking a "checkpoint" refers to saving at least a portion of an architectural state of the processor at the time of the checkpoint so that instruction can later be resumed by using these saved values. As used herein, a "checkpoint condition" refers to a condition that causes a checkpoint to be taken. Examples of a checkpoint condition include a cache miss and a branch prediction. In a processor supporting scouting mode, upon the processor taking a checkpoint at I201, the execution of I203 (and other subsequent instructions) may be performed to cause data to be prefetched from memory into the cache. Accordingly, instead of simply stalling until I201's results are available, the processor can proceed to determine if the memory value for Address2 (used by I203) is present in the cache. If the value is not present, the processor can cause the memory subsystem to begin fetching the Address2 value from memory at the same time that Address1 value is also being fetched. The delays caused by I201 and I203 will thus overlap instead of being sequential, which can lower the overall total delay experienced during program execution. In some embodiments of scouting mode, only memory load instructions are executed. In other embodiments of scouting mode, instructions other than memory loads are executed as well. Instructions executed in scouting mode are not committed, however. Upon resolution of the current checkpoint condition, the instructions that were executed in scouting mode are re-executed, preferably with reduced cache misses. In other words, once scouting mode is finished (e.g., once execution results of I201 are available), normal execution may be resumed at or after the checkpoint—in the above example, at instruction I202.

Instructions executed in scouting mode are not committed. Discarding some instruction results in scouting mode, however, may be unnecessary, as some instructions may be able to execute correctly. In the instruction sequence above, for example, I204 does not depend on instructions I201-I203. Thus, executing I204 during scouting mode may yield a correct result. By discarding (or simply not saving) the result obtained in scouting mode for I204, the processor will end up re-executing that instruction and doing the same work twice.

"Execute-ahead mode" allows some duplicate work to be avoided, resulting in a further performance gain. In execute-ahead mode, when a checkpoint condition occurs, the processor is configured to commit one or more instructions, thus obviating the need for later re-execution. Referring to the exemplary code sequence, the processor may selectively save the correct results of instructions (such as I204) that do not need to re-executed. Instructions such as I202 that may not correctly execute during scouting mode, however, are simply executed again when execution restarts at or after a checkpoint to obtain a correct value. Alternatively, instructions such as I202 can be "deferred" (e.g., placed in a deferred queue) while the processor is operating in execute-ahead mode, which allows the processor to complete these instructions upon the data dependencies that caused the deferrals being resolved. Accordingly, as used herein, "execute-ahead mode" refers to a processor operating mode in which the processor is configured to commit one or more instructions while there is at least one active checkpoint corresponding to a respective check point condition. Furthermore, as used herein, the term "deferred" in regard to instructions includes postponing complete execution and commitment of the instructions. The term "deferred mode" refers to various techniques for causing a processor to execute and commit deferred instructions (i.e., taking actions for the instructions at a later time).

General Overview of a Multithreaded Processor

Figure 2:
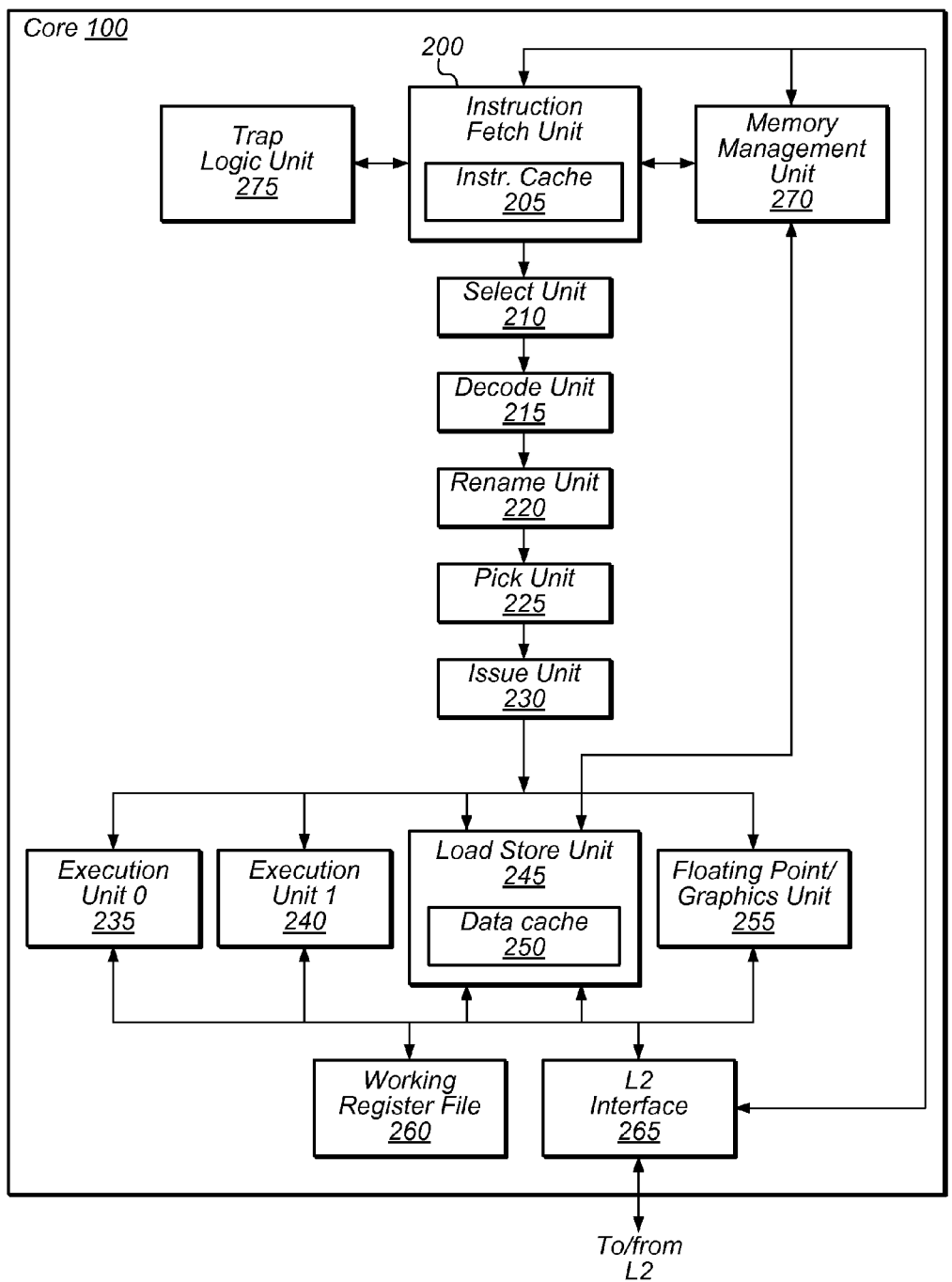
FIG. 2 is a block diagram illustrating an embodiment of a processor core 100.

FIGS. 1-2 present an overview of an exemplary multithreaded processor. Various elements and features of core 100 may be present in processor core 300, discussed further below with reference to FIG. 3. Scouting and checkpointing are not discussed specifically with respect to FIGS. 1 and 2. Discussion of these concepts resumes with FIG. 3. Structures (or portions thereof) in processor core 300 may in some embodiments include one or more structures (or portions thereof) that are depicted in core 100. Processor 10 and processor core 100 may in some embodiments have structures usable to implement scouting mode and checkpointing techniques as in processor core 300, as well as other structures generally usable for instruction execution.

Turning now to FIG. 1, a block diagram illustrating one embodiment of a processor 10 is shown. In certain embodiments, processor 10 may be multithreaded. In the illustrated embodiment, processor 10 includes a number of processor cores 100*a-n*, which are also designated "core 0" though "core n." As used herein, the term processor may refer to an apparatus having a single processor core or an apparatus that includes two or more processor cores. Various embodiments of processor 10 may include varying numbers of cores 100, such as 8, 16, or any other suitable number. Each of cores 100 is coupled to a corresponding L2 cache 105*a-n*, which in turn couple to L3 cache 120 via a crossbar 110. Cores 100*a-n* and L2 caches 105*a-n* may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Decode unit 215 is described in greater detail in conjunction with FIGS. 5, 7, and 8 below.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

TLU 275 is described in greater detail in conjunction with FIGS. 5, 6, and 8 below.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Figure 3:
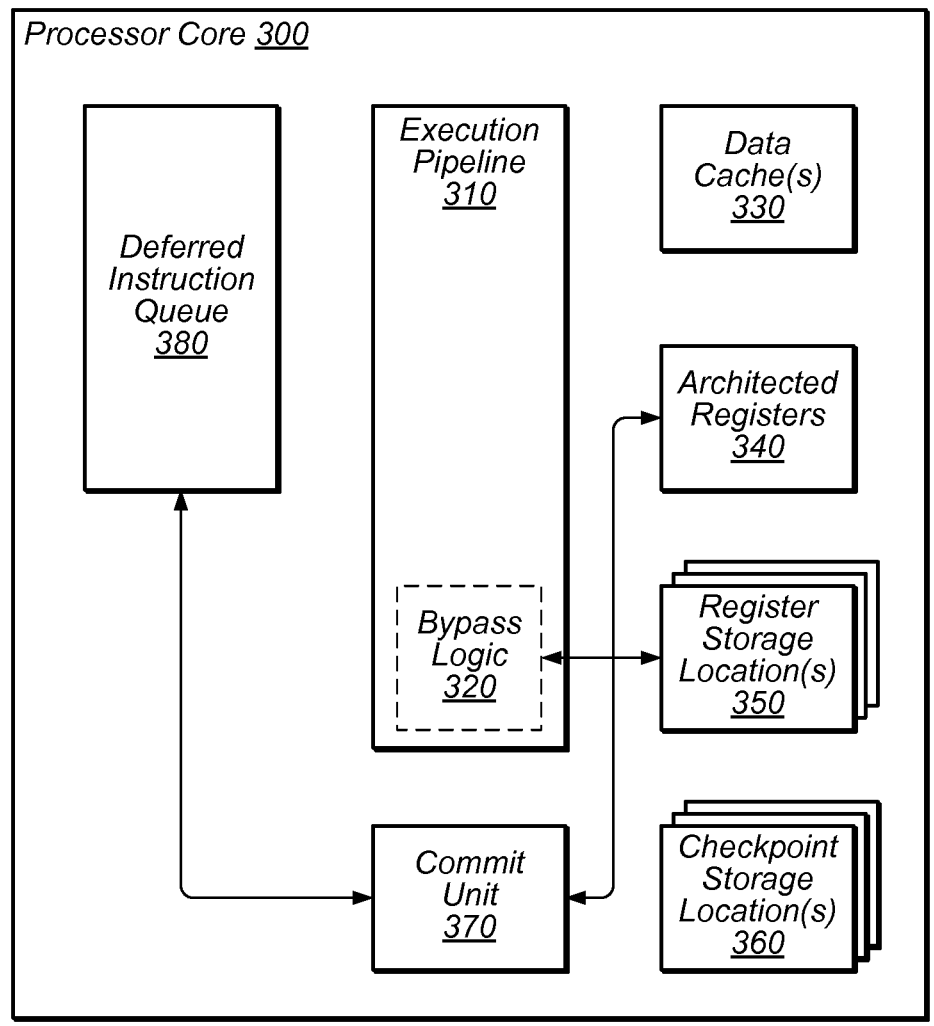
FIG. 3 is a block diagram illustrating an exemplary processor core 300 having structures usable to implement scouting mode and checkpointing operations.

FIG. 3 shows a block diagram of an exemplary processor core 300 having structures usable to implement scouting mode and checkpointing operations. As noted above, structures of core 300 may overlap in whole or in part with other structures depicted in core 100 and/or processor 10.

Core 300 includes execution pipeline 310, which is configured to execute instructions. Bypass logic 320 may be present within execution pipeline 310, and/or elsewhere in core 300. Data cache(s) 330 may be configured to interact with other portions of a memory/memory subsystem (e.g., an L2/L3 cache or main memory) in order to provide data to execution pipeline 310. Architected registers 340 store values corresponding to various architected registers that are specified by instructions within an instruction set that pipeline 310 is configured to execute. Register storage location(s) 350 are configured to communicate with bypass logic 320, and may store values corresponding to architected registers (though these stored values in 350 may only be "active" or "working" values, and not "committed" values, in some embodiments). Checkpoint storage location(s) 360 may be used to store architectural state information corresponding to one or more checkpoints. Commit unit 370 may cause instruction results to be committed to an architectural state of the processor, and may also contain logic to detect checkpoint conditions, and to transition between various processor operating modes such as execute-ahead mode, scouting mode, and deferred mode. Deferred instruction queue 380 may store deferred instructions accrued during execute-ahead mode.

As used herein, the term "execution pipeline" refers broadly to circuitry within a processor that is configured to perform one or more actions needed to determine the result of an instruction being executed by the processor. Execution pipeline 310 comprises one or more execution units configured to execute instructions. These execution units may in some embodiments comprise units 235, 240, 245, and 255, and/or may comprise a plurality of any or all of the following: an arithmetic logic unit (ALU), a branch logic unit, a floating point and/or graphics unit, and a memory logic unit. In various embodiments, execution pipeline 310 may include a decode unit, a trap unit, etc. Execution pipeline 310 may be configured to interact with various other structures within processor 10 or processor cores 100 and/or 300, such as memory interface 130, caches 120 and 330, bypass logic 320, architected registers 340, and commit unit 370. (In some embodiments, commit unit 370 could also be considered a part of the execution pipeline.) These various other structures may provide execution pipeline 310 with operands and other values necessary for instruction execution. Structures not explicitly listed above or not illustrated as being within core 300 may also communicate with execution pipeline 310 in some embodiments.

Bypass logic 320 is configured to provide (or forward) results of in-flight instructions to execution pipeline 310. An in-flight instruction is an instruction that has not yet been committed to the architectural state of the processor (but whose result may have been already been determined). For example, a first instruction's results may become known after an ALU (or other unit in pipeline 310) finishes a calculation. The bypass logic 320 may supply the first results to a second instruction needing them, rather than waiting for the first instruction to commit and the results to appear in the architected registers 340 (or another location such as checkpoint storage locations 360). Bypass logic 320 may be located partially or wholly within execution pipeline 310, or elsewhere within core 300. In some embodiments, bypass logic 320 is always active or operational (that is, it is always "on" and providing values to execution pipeline 310), although in any given clock cycle, the values provided to execution pipeline 310 by bypass logic 320 may or may not actually be used. In some embodiments and as described below, the bypass logic's active/operational characteristics allow it to work effectively while the processor is in scouting mode.

Results of instructions may be stored in architected registers 340, in register storage location(s) 350, and/or in checkpoint storage location(s) 360. Architected registers 340 may store a plurality of values representing one or more architectural states for one or more threads being executed by the processor. In contrast, register storage locations 350 may store a plurality of values that do not necessarily represent an architectural state, but instead represent a "working" state composed of uncommitted (possibly speculative) values. Indeed, it is possible that values in register storage locations 350 will never be committed to an architectural state (some results stored in 350 may be discarded, for example, if a branch is mispredicted). In various embodiments, structures 340, 350, and 360 may correspond to integer registers, floating point registers, sets of windowed registers (as in the SPARC architecture), other special registers, etc. In one embodiment, register storage locations 350 include a working register file (such as file 260). In another embodiment, register storage locations 350 include a register file with a multi-ported active cell. Many variations of locations 350 may be present in various embodiments, however, and more information regarding embodiments of register storage locations 350 is provided below in the context of FIGS. 5A-5B.

Data cache(s) 330 may operate as a cache for system memory, allowing execution pipeline 310 to receive values in significantly less time than it takes to access main memory. Data cache(s) 330 may comprise a multi-layer set of caches (e.g., L1, L2, and L3). Data cache(s) 330 may also comprise a translation lookaside buffer and/or a data translation lookaside buffer (TLB/DTLB). In scouting mode, data cache(s) 330 may be configured to load data from main memory or from one cache to another (e.g., L3 to L1) in order to reduce thread execution time when multiple cache misses occur. Although portions of this specification may refer to instruction results being discarded, disregarded, or otherwise not saved during scouting mode execution, this does not necessarily mean that values are discarded from the cache 330 for a memory load executed in scouting mode. Instead, discarding results may simply refer, for example, to flushing register values from register storage locations 350 prior to exiting scouting mode.

Checkpoint storage location(s) 360 are configured to store information sufficient for one or more checkpoints of an instruction stream (or program, or thread) being executed. The information in 360 may include a full copy of all architected registers, i.e., it may include an architectural register file usable to take a "snapshot" of the processor or processor core. The checkpoint information stored in locations 360 may be used to resume or roll back execution to a particular instruction or portion of a program. As depicted in FIG. 3, taking a checkpoint may thus constitute copying architected registers 340 to an available checkpoint storage location 360. In other embodiments, however, there is no pre-designated group of architected registers such as 340, and instead any one of a number of architected register file copies within location(s) 360 may represent a current "base" architected state of the processor (i.e., in some embodiments, architected registers 340 are included in checkpoint storage locations 360). As used herein, a base architectural state refers to a state of the processor that includes only the results of instructions that have been committed. In various embodiments, other information necessary for a checkpoint may also be stored in checkpoint storage locations 360, or in any other location accessible to processor core 300. As used herein, the term "architected register file" refers to a structure capable of storing values corresponding to registers in a set of architected registers. In some embodiments, an architected register file may be configured to store a value for each and every one of a set of architected registers.

Commit unit 370 is configured to cause instructions to be committed to an architectural state of the processor (i.e., retired). In various embodiments, commit unit 370 may interact with architected registers 340, register storage locations 350, and/or checkpoint storage locations 360. As explained in further detail below with regard to FIG. 4, commit unit 370 may contain logic usable to determine whether a checkpoint condition exists, and whether the processor should operate in "normal" execution mode, execute-ahead mode, scouting mode, or deferred mode (or some other mode). In some embodiments, commit unit 370 may be configured to interact with execution pipeline 310 or other structures within cores 100 and 300 (or within processor 10). In some embodiments, commit unit 370 is located wholly or partially within trap logic unit 275.

In execute-ahead mode, commit unit 370 may cause instructions to be deferred by storing them in deferred instruction queue 380. An instruction may be deferred, for example, when one of its operands cannot be resolved due to a dependency on another instruction (e.g., a memory load that misses the cache). Deferred queue 380 stores information usable to cause a not-fully-executed instruction to have its execution completed (or restarted) at a later time.

Figure 4:
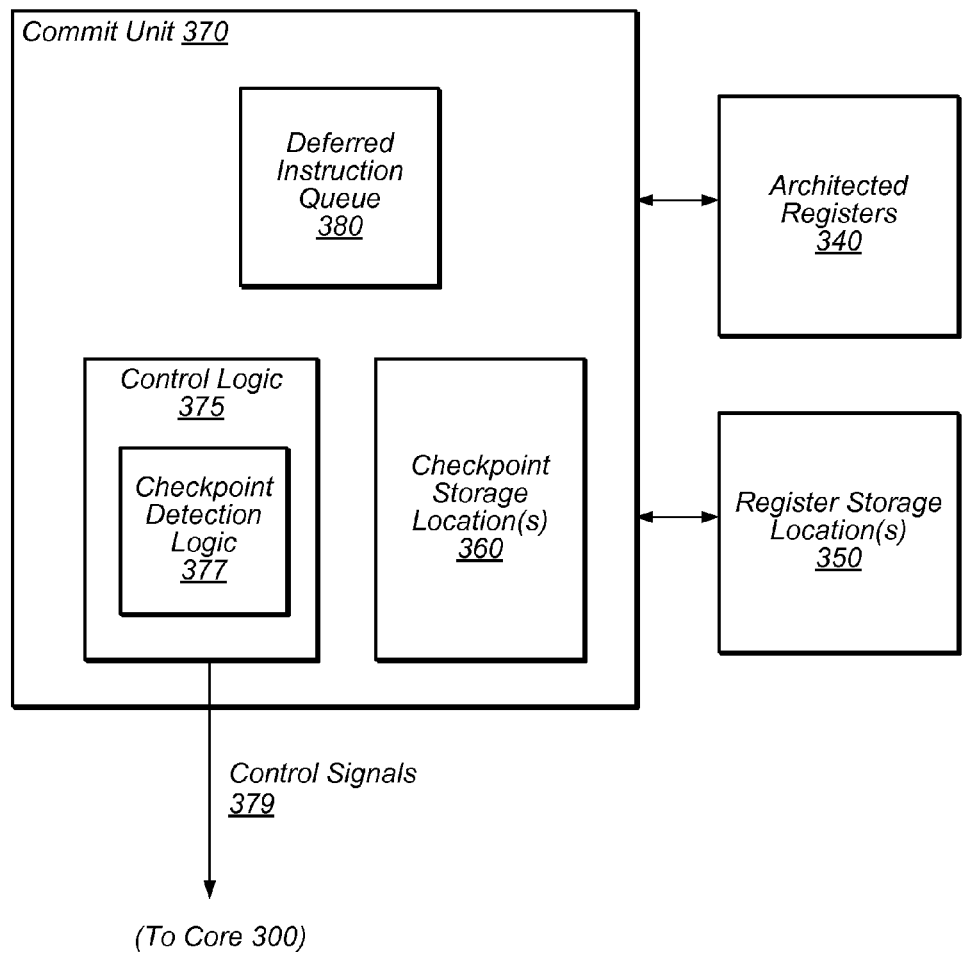
FIG. 4 is a block diagram of one embodiment of commit unit 370.

Turning now to FIG. 4, an embodiment of commit unit 370 is shown. In this embodiment, checkpoint storage location(s) 360 and deferred instruction queue 380 are within the commit unit. Architected registers 340 and register storage location(s) 350 are depicted external to commit unit 370. Also included in commit unit 370 is control logic 375 and checkpoint detection logic 377.

Control logic 375 is configured to determine what operating mode the processor should be in. In some embodiments, these modes include normal (or default) mode, execute-ahead mode, scouting mode, deferred mode, etc. The current operating mode prescribed by logic 375 may depend on checkpoint detection logic 377, which is configured to determine if a checkpoint condition exists with respect to instructions being executed.

A checkpoint condition may occur under a variety of circumstances. Examples of instructions that may correspond to a checkpoint condition include a memory operation (e.g., a load or store) that misses in a DTLB of cache(s) 330, a branch instruction that cannot be resolved due to a dependency on another pending instruction (especially one with a long latency), or a long-latency floating point instruction such as a division or a square root. (Note: when an instruction triggers the taking of a checkpoint, that instruction may be said to "correspond to" the checkpoint that is taken. Similarly, a checkpoint may be said to "correspond to" a checkpoint condition that is an underlying cause of the checkpoint). Other circumstances that may indicate a checkpoint condition include receiving an indication, while operating in execute-ahead mode, that deferred queue 380 is nearly full, or that a store queue (i.e., a structure used to buffer outbound stores to the memory subsystem—L1 cache, L2 cache, L3 cache, main memory, etc) is almost full. Another factor influencing checkpoint condition detection (i.e., the decision to take a checkpoint) is how recently a checkpoint was last taken. In certain embodiments, if a checkpoint was taken within the last thirty two instructions, for example, checkpoint detection logic 377 may view this as "too soon" to take another checkpoint, regardless of other factors that might indicate a checkpoint would be desirable. Because a checkpoint condition may be determined by any one or more of a variety of factors including instruction type, (expected) instruction latency, utilization of deferred and/or store queues, recency of the last checkpoint, or other factors, heuristics may be employed by checkpoint detection logic 377 to determine whether a checkpoint should be taken with respect to a particular instruction being executed.

When the outcome or result of a particular instruction that corresponds to a checkpoint becomes known, control logic 375 may take various actions, including releasing (freeing) an active checkpoint and/or transitioning the processor operating mode. Releasing an active checkpoint may include marking an instance of the architectural register file (ARF) as free, e.g., marking one of checkpoint storage locations 360 as available (or even marking architected registers 340 as available, as in some embodiments ARF portions of 340 and 360 may be equivalent and interchangeable.) Control logic 375 may be configured to send various control signals 379 to other parts of core 300/core 100/processor 10, such as execution pipeline 310, to indicate that certain actions should be taken under the current operating mode. The control signals may of course vary depending upon the mode in which the processor is operating.

Exemplary descriptions of the various operating modes are as follows. In normal mode, no checkpoint is active, and only one copy (per thread) of the architected register file is stored. Values not yet committed to a "base" architectural state are stored temporarily (e.g., in register storage locations 350). At the time a value is stored in 350, it may correspond to an instruction that that was "in-flight" at the time the value was written. Committed values are stored in architected registers 340 (or in some embodiments, any one of checkpoint storage locations 360).

In execute-ahead mode, at least one checkpoint is currently active (in use). Thus in addition to an ARF that stores a base architected state, at least one other copy of an ARF will be in use (e.g., one ARF copy may contain historical data for a checkpoint, while another copy is updated with fresh results calculated in execute-ahead mode). In various embodiments, this base architectural state may be maintained in an active checkpoint storage location 360 that is oldest in program order. In other embodiments, dedicated architected registers 340 may store the base (oldest) architectural state.

Accordingly, while in execute-ahead mode (and while a checkpoint is active), a current copy of the ARF receives values from instructions that have been speculatively executed. (This current copy may be any one of registers 340 or 360.) Thus, when an instruction executed in execute-ahead mode reaches the commit stage, its results are stored in the current copy of the ARF. The results stored in the current copy of the ARF may or may not ultimately be committed to the base architectural state of the processor, because the results may be discarded in the event that the speculative state represented by the current ARF copy is determined to be incorrect (e.g., a checkpoint was taken on branch instruction, and it was later determined that the branch was predicted incorrectly.) Accordingly, in association with execute-ahead mode, the entire contents of the current ARF copy (which may be in 340, 360 or elsewhere) may ultimately be discarded, and checkpoint storage locations 360 may be used to reset an architectural state of the processor. Results of in-flight instructions in execute-ahead mode may also be stored in register storage locations 350, and these results may be overwritten or discarded upon an exit from execute-ahead mode or a decision to roll back to a previous checkpoint and disregard the instructions taken after it.

During execute-ahead mode, instructions that can be executed (e.g., that do not have dependencies) are executed. Some instructions, on the other hand, may be deferred. For example, a group of instructions may be dependent on a first instruction that corresponds to a checkpoint condition, and this first group of instructions may thusly be deferred. Instructions not dependent in this manner may safely be executed (unless some other dependency prevents this). When an instruction is deferred, it is either not executed or it is not fully executed, and is instead stored in deferred instruction queue 380 (or another appropriate structure) to await execution at a later time. See FIGS. 6A-6D below for a more detailed discussion.

In deferred mode, the processor is configured to execute previously deferred instructions from deferred instruction queue 380. This deferred execution may occur at some point a checkpoint condition is resolved. In one embodiment, one thread may operate to execute deferred instructions for another thread (or instruction stream).

In contrast, in scouting mode, as described above, instructions are executed but their results are not committed (or stored in a current copy of the ARF), as the purpose of scouting mode is to cause data corresponding to cache misses to be prefetched so that this data is available later with less of a delay (for example, at a time that scouting mode has ended because a checkpoint storage location becomes inactive due to a resolved checkpoint). As described herein, when scouting mode is engaged at a time when all architectural register files (e.g., 340 and/or 360) are being used for checkpoints, results of instructions thus may not be stored in a full copy of the ARF, but instead may be stored in register storage locations 350. Results in 350 are stored therein when the results of in-flight instructions are calculated (or thereafter), and in some embodiments the results in 350 may be overwritten when results of other, later-executed in-flight instructions become known. Thus, results in 350 may thus be temporary and reflect a "moving window" of the results of recently executed/currently in-flight instructions. In various embodiments, results stored in register storage locations 350 may be retained for some time after an instruction commits, while in other embodiments, it may be the case that a result is erased when its value commits to a full copy of the ARF. Further detail is provided below.

Turning now to FIG. 5A, a block diagram 500 shows an embodiment 501 of register storage locations 350. In this embodiment, register storage locations 501 also comprise an embodiment of working register file (WRF) 260.

Register storage location 501 is configured to store results of in-flight instructions. Each one of entries 530 can be flexibly used to store results destined for any given register. Thus, the destination register identity (510) of entry 531 is specified as Reg0. Entry 531 has a thread id (512) of 0, and is shown as storing a value (514) of 0. The youngest bit (516) for entry 531 is set to 1, indicating that amongst all the entries in register storage locations 501, entry 531 represents the most current value of Reg0 for thread 0. (A "youngest bit" may also be considered a "valid" bit in some embodiments). Entries 532 and 533 both specify a register of Reg3 for thread 1, but their youngest bits indicate that entry 533 has overwritten entry 532. Thus, 299 is the current (valid) value of Reg3 in thread 1.

For any given register/thread combination, only one entry (at most) in register storage locations 501 will be marked with a youngest bit of 1. In some embodiments, register storage locations 501 and/or working register file 260 may be implemented using a content addressable memory (CAM).

Turning to FIG. 5B, a diagram 550 depicts an embodiment 551 of register storage locations 350 that corresponds to a different scheme than the embodiment of FIG. 5A. In register storage locations 551, each entry 580 corresponds to exactly one architected register for a given thread. As shown, register storage locations 551 depicts a series of floating point registers, but many different types of registers may be included within register storage locations 350, 501, or 551. The entry for fReg0 shows a committed value of 3.14159265, which corresponds to a committed state (e.g., the base architectural state). The entry for fReg0 has a working (active cell) value of 3.1, which represents a current, not-yet-committed value. As depicted, register storage locations 551 supports threads from 0 to 3, and for each thread, a series of P entries exists (where P is the number of architected registers specified by an instruction set, for example). Thus, the total size of register storage locations 551 is generally fixed and is given by the formula M×P, where M is the number of threads supported and P is the number of architected registers. In contrast, the size of register storage locations 501 may in some embodiments be more easily variable, as a given entry can be used for different register/thread combinations at different times. Both register storage locations 501 and 551 are respectively configured to forward working values 514 and 564 through bypass logic 320 to execution pipeline 310. Although 501 and 551 are shown relative to a multi-threaded processor, a person of skill in the art may easily adapt these structures to a processor supporting only a single thread.

Figure 6:
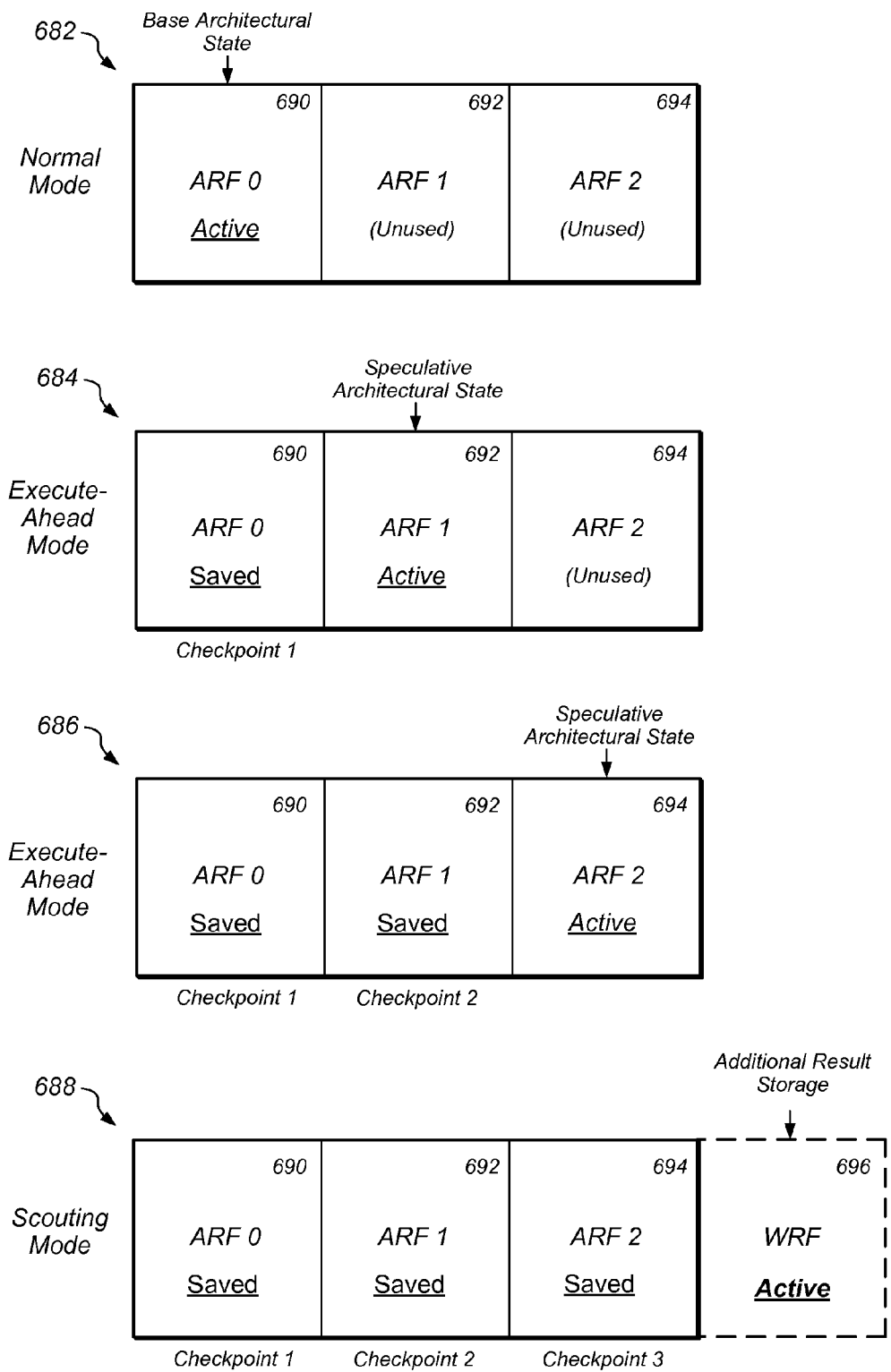
FIG. 6 is an exemplary depiction of the utilization of architectural register files and other structures during various processor operating modes.

Turning now to FIG. 6, illustrations 682-688 are shown depicting the use of three checkpoints with three architectural register files (ARFs), a working register file (WRF), and bypass logic. The ARFs may be present in structures 340 or 360, which may contain equivalencies in some embodiments. For example, while FIG. 3 above shows architected registers 340 separately from checkpoint storage locations 360, it may be the case in some embodiments that structures 340 and 360 are combined (wholly or partially). Thus in these embodiments, while a current, active state of the processor must be maintained while executing normally (or in execute-ahead and deferred modes), no particular ARF may be dedicated to storing a current active state of the processor. Thus as shown in FIG. 6, any of ARFs 690, 692, and 694 may be flexibly used, and any one of them may be used for a checkpoint, or to store current, active values that are updated when results of instructions reach a commit stage.

In a processor having N+1 architectural register files, a maximum of N checkpoints may be supported in conjunction with execute-ahead mode. This is due to the fact that, as explained above, one ARF is generally used for an active (or current) architectural state while up to N others may be used for checkpoints. When N checkpoints are active (in use), N copies of the register file are thus being used for historical purposes—they are preserving values so that execution can be rolled back if necessary.

In illustration 682, the architectural register 690 (ARF 0) is being used to store committed results from normal execution. As instructions are committed, their results become stored in ARF 0 as part of the base architectural state of the processor. For purposes of this example, the base architectural state stored in ARF 0 and shown in 682 cannot be "rolled back," as there is no other processor state available to be rolled back to (e.g., no other architectural register file is storing a valid architectural state, as ARF1 and ARF 2 are both unused).

Illustration 684 occurs subsequent in program order to 682. It shows that the processor has encountered a checkpoint condition, and used ARF 0 to take a checkpoint (saving the base architectural state). The processor has transitioned to operating in execute-ahead mode, and has activated architectural register file 692 (ARF 1) to store the results of instructions completed during execute-ahead mode. Recall that these results may ultimately be discarded, as they do not represent the base architectural state. If it is discovered that the results being saved in ARF 1 do not correspond to a valid program order—e.g., they correspond to a mispredicted branch—then execution results written to ARF 1 can be discarded, and ARF 0 can be used to restore execution at Checkpoint 1. (Conversely, if at some later time it is determined that the results stored in ARF1 are valid, ARF0 could be freed and ARF1 could become the new base architectural state of the processor).

Illustration 686 occurs subsequent in program order to 684, and shows that the processor has encountered another checkpoint condition. A second checkpoint has been taken and an architectural state has been saved in ARF 1. Architectural register file 694 (ARF 2) is now actively being used to store the results of instructions executed in execute-ahead mode. Execution may be rolled back to either Checkpoint 1 or Checkpoint 2 if needed.

Illustration 688 occurs subsequent in program order to 686, and after the processor has encountered yet another checkpoint condition. ARF 2 is used to store information for Checkpoint 3. Consequently, no additional architectural register file is free. Thus while the processor of FIG. 6 has an N equal to three (i.e., a maximum of 3 checkpoints are supported), after the third and final checkpoint is taken, there is no way to continue in execute-ahead mode as there is no suitable full copy of the architectural register file in which to store all possible types of instruction results. Thus, instructions following Checkpoint 3 in program order may have no permanent location in which their results can be stored.

A location can be provided, however, for results of instructions executed when all possible checkpoints are active in register storage locations 350 (and/or bypass logic 320). (In illustration 688, a working register file 696 is used to implement register storage locations 350, though other embodiments of register storage locations 350 are possible). By storing a result of an instruction subsequent to Checkpoint 3 in the working register file (WRF), execution pipeline 310 can obtain that result through the bypass logic 320. This allows continued execution and for additional work to be done by the processor even though no full copies of the architected register file are free.

Accordingly, although it is no longer possible to operate in execute-ahead mode subsequent to Checkpoint 3 being taken, scouting mode may be engaged to perform additional work. Scouting mode may operate to determine if any future instructions will cause cache misses, and work to eliminate or reduce those misses. Use of scouting mode necessarily requires the ability to determine, however, what memory addresses will be needed in the future (as it is not possible to accurately prefetch data without knowing the location of that data). For each memory load instruction in scout mode, the memory address must be determined before attempting to make sure the appropriate corresponding data has been cached.

Immediately following Checkpoint 3, making this memory address determination is simple. All register values stored in ARF2 will be accurate and correct with respect to the first instruction immediately proceeding Checkpoint 3, so if the first instruction is a memory load, the ARF2 values can simply be used to determine the memory address needed. As execution in scouting mode continues, however, the working may change such that the ARF2 values are no longer accurate (e.g., other instructions are being executed in scouting mode that are changing the current state of the processor). Ordinarily, an active copy of the ARF would be used to reflect this current state, but no such copy is available in the example of FIG. 6. Instead, WRF 696 will hold values of instructions subsequent to Checkpoint 3, and to the extent possible, these values from the WRF will be used in scouting mode to accurately determine memory addresses even as the current processor state gets progressively further away from the state reflected by Checkpoint 3. By actively using the WRF (i.e., register storage locations 350), scouting mode may thus effectively function to prefetch data into cache 330 even when all N architectural files are in use by checkpoints, and even when a memory operand must be determined using results of instructions executed in scouting mode.

Figure 7A:
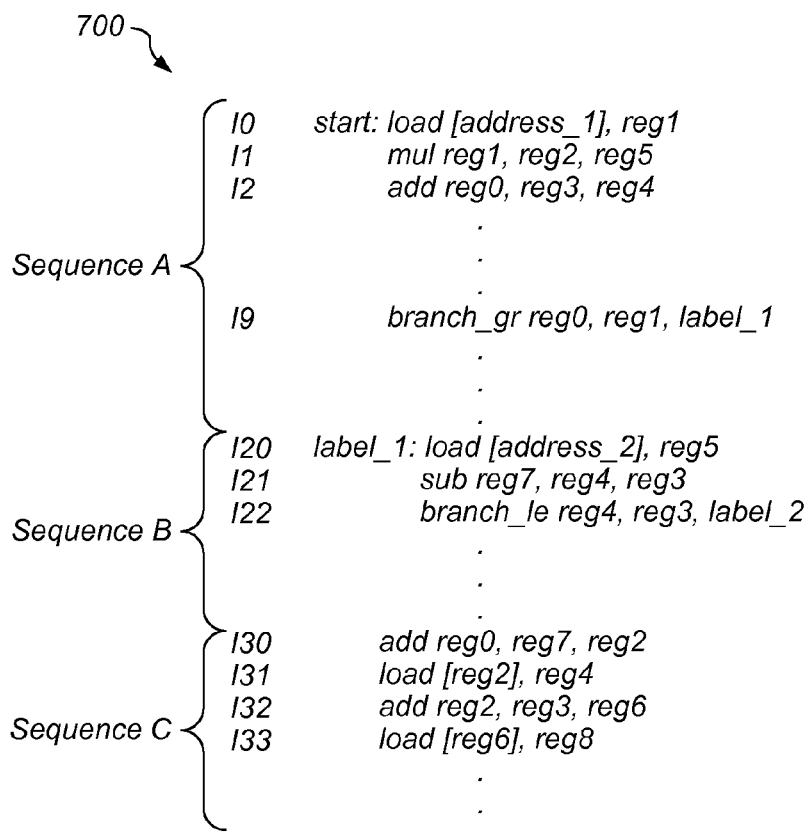
FIGS. 7A-7D illustrate exemplary processor operating modes.

FIGS. 7A-7D provide an illustrative example of processor operating modes with respect to the execution of instruction sequences A, B, and C (shown in illustration 700 of FIG. 7A). Instruction I0 has the label "start," which is not part of the instruction (similarly, I20's label of "label_1" is also not part of that instruction, but is shown for illustrative purposes). Also, in this example, the processor has three available ARFs (as in FIG. 6). Note that for purposes of this example, architected registers 340 and checkpoint storage locations 360 may each include any one or more of architected register files 790, 792, and 794.

Figure 7B:
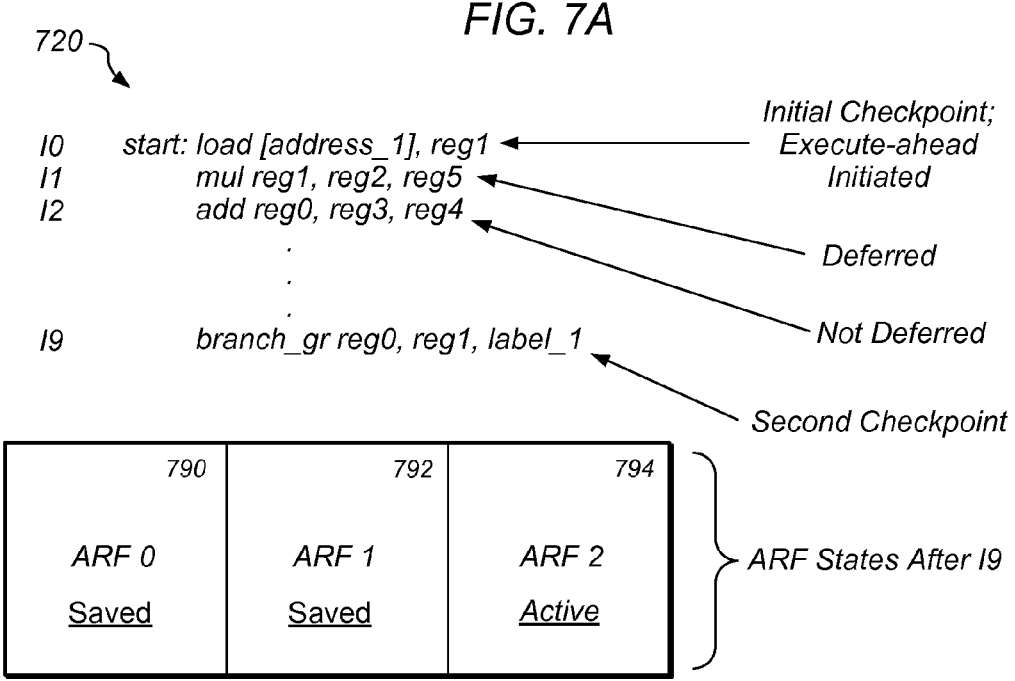

Turning to FIG. 7B, I0 is an instruction to load memory from the location specified by "address_1" (for this example, the particular value of address_1 is unimportant). Checkpoint detection logic 377 determines that cache(s) 330 do not contain the value for address_1 (and thus that a long latency will ensue as other portions of the memory subsystem are accessed). A first architectural register file 790 (ARF 0) is used to take an initial checkpoint corresponding to I0, and control logic 375 causes the processor to enter execute-ahead mode. I1 is an instruction to multiply register "reg1" by register "reg2" and store the resulting value in "reg5." This instruction immediately succeeds I0, and the value for reg1 is not yet available as it is being retrieved from memory. I1 is thus deferred to be executed at a later time, and is stored in deferred instruction queue 380 (not shown). I2 does not depend on I0, and as it is executed in execute-ahead mode, a working value for "reg4" is stored in register storage locations 350. That value is later committed to architectural register file 792 (ARF 1, which is being used to store a speculative architectural state).

After other intervening instructions (not depicted), program flow arrives at instruction I9. I9 is a branch instruction that will cause a jump to "label_1" if the value of register "reg0" is greater than the value of register "reg1." In this example, at the time this instruction is encountered, the processor is still waiting for a value of reg1 to be returned from I0. Checkpoint detection logic 377 again determines that a checkpoint condition exists, and architectural register file 792 (ARF 1) is used to take a second checkpoint. In FIG. 7B, ARFs 790, 792, and 794 are shown depicting their states after instruction I9.

Figure 7C:
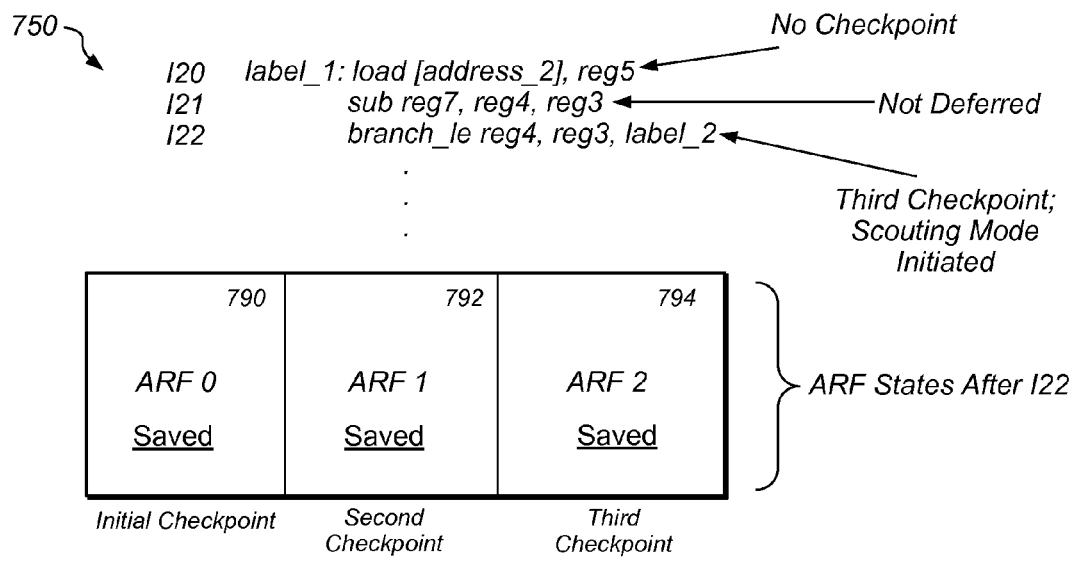

Turning now to FIG. 7C, instruction sequence B is shown in depiction 750. Execute-ahead mode continues at 120 (label_1, which is jumped to by the branch predictor for I9). I20 is a memory load that will miss the cache in this example, but checkpoint condition logic 377 elects not to take a checkpoint. (This may be because I20 immediately follows I9, which is too soon after the last checkpoint taken to then take another one.) I21 is executed in execute-ahead mode, and the result is stored in the entry for "reg3" in register storage locations 350 (not depicted; and later, that value will also be stored in ARF2). I22 is a branch instruction (jump to label_2 if reg4 is less than or equal to reg3). I22 causes a third checkpoint condition, resulting in architectural file 794 being used to save a third checkpoint. This leaves the processor with no free, full copies of the architectural register file in which to store instruction results. However, register storage locations 350, as noted above, are available to store results of "in-flight" instructions as the processor begins executing in scouting mode. I22 is not predicted as a branch, and program flow eventually continues to I30. The states of ARFS 790, 792, and 794 are shown after the third checkpoint has been taken.

Figure 7D:
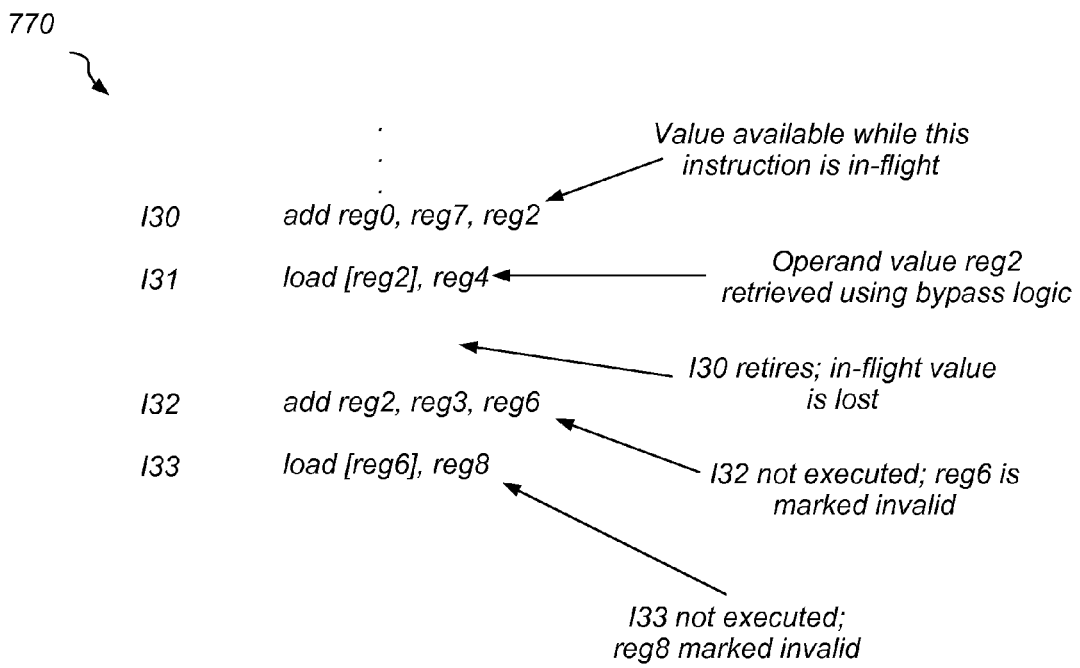

In FIG. 7D, instruction sequence C (I30 to I33) is shown in depiction 770. I30 is executed in scouting mode, and the in-flight result for "reg2" is stored in register storage locations 350. Scouting mode execution on I31 uses the bypass logic 320 to retrieve the stored "reg2" value from register storage locations 350. The retrieved reg2 value is then used as an operand for I31. The cache is checked to see if I31's memory address is present, and if not, the value is prefetched from main memory while in scouting mode. Thus, while the memory load from I1 is still pending from main memory and all full copies of the architectural file are in use, register storage locations 350 are used with bypass logic 320 to start an additional memory prefetch for I31, potentially lowering overall execution time.

Scouting mode proceeds to I32, but for purposes of this example, before I32 acquires its operand value for reg2 (from bypass logic 320), previous instruction I30 retires (commits), and the reg2 value is lost from register storage locations 350. (Note that in other embodiments, the value in register storage locations 350 would not necessarily be immediately lost upon an instruction retiring; rather, the value might remain until it is overwritten). I32 thus cannot be properly executed in scouting mode as it lacks an operand value for reg2, and is unable to acquire a valid value from register storage locations 350 (or from an architected register file). I32's destination register "reg6" is therefore marked as invalid or unavailable. When execution pipeline 310 attempts to use reg6 as an operand for I33 while in scouting mode, it will observe that reg6 has no valid value, and destination register reg8 for I33 will likewise be marked as invalid or unavailable for scouting mode operation.

Figure 8:
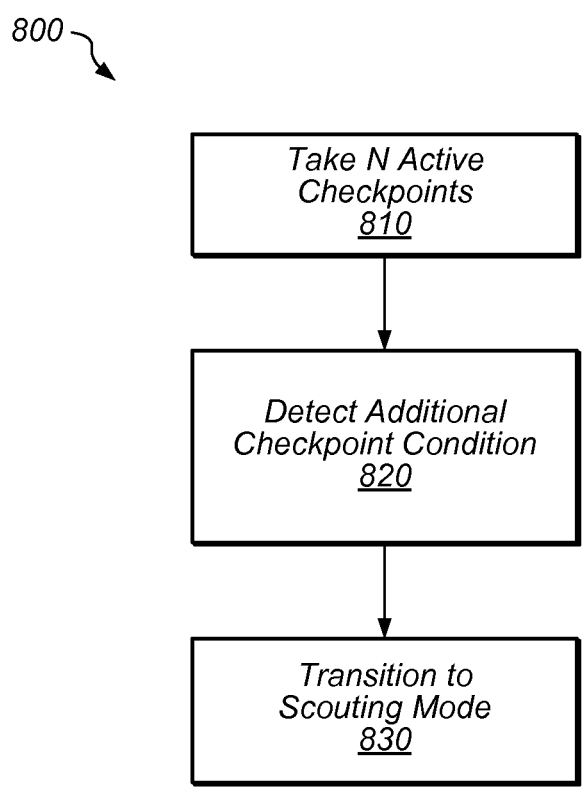
FIG. 8 is a flowchart of one embodiment of a method of operating a processor in scouting mode when N active checkpoints are active.

Turning now to FIG. 8, a flowchart 800 is shown for a method of operating in scouting mode while N+1 checkpoints are active (i.e., when N+1 structures suitable for storing checkpoints are in use). In step 810, the processor takes N active checkpoints, where N+1 is the number of checkpoints supported by the processor. All N checkpoints are not necessarily taken simultaneously, but rather, each checkpoint is taken as checkpoint detection logic 377 detects various checkpoint conditions corresponding to instructions being executed. (At a minimum, N checkpoint conditions will be detected to cause the processor take the N active checkpoints.)

In step 820, an additional checkpoint condition is detected while N checkpoints are active—that is, while all but one checkpoints supported by a processor are in use (at least for a given thread), another condition is detected in which checkpoint detection logic deems it desirable (or mandatory, depending on what rules are in place) to take the additional checkpoint. In response, in step 830 the processor transitions to executing instructions in scouting mode (at least for the given thread) for instructions subsequent to the additional checkpoint. This transition to scouting mode includes taking one additional checkpoint and thus causing the processor to operate at its maximum number of supported checkpoints (in this case, N+1). As previously noted, in scouting mode, the register storage locations 350 are used whenever possible into calculate operands for instructions subsequent to the N+1th checkpoint, and data may accordingly be prefetched into caches 330. In some embodiments the structures that allow for N+1 checkpoints to be taken (e.g., structures 340 and/or 360) are implemented using N+1 instances (or copies) of an architected register file for the processor.

Figure 9:
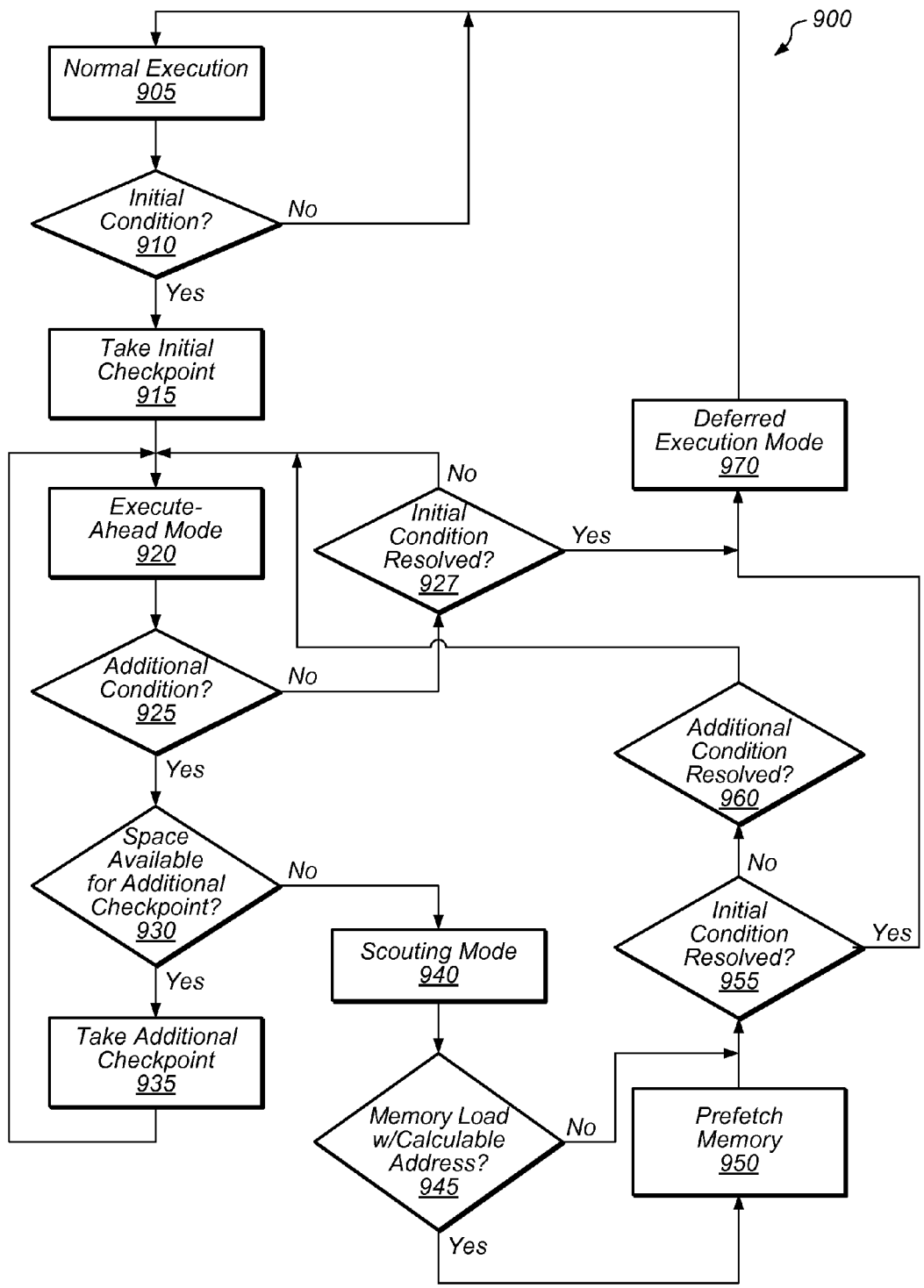
FIG. 9 is a flowchart of one embodiment of a method of operating the processor in various operating modes while performing checkpointing, scouting, and other operations.

Turning to FIG. 9, a more detailed flowchart 900 is shown to illustrate operating modes in some embodiments. In various embodiments, steps in flowchart 900 are performed by the processor core 300 and/or processor core 100, including commit unit 370 and/or control logic 375 and/or checkpoint detection logic 377. In various embodiments, these steps may be performed in parallel for two or more threads or instruction streams. Additionally, although the flowchart attempts to be more comprehensive than method chart 800, for simplicity, not all possible steps or transitions are necessarily depicted.

Normal execution begins (or resumes) in step 905, in which instructions are executed and one architectural register file (e.g., structure 340) is in use to hold committed instruction results corresponding to a base architectural state. No checkpoints are active. Step 910 determines whether an initial checkpoint condition has occurred. If no checkpoint condition has occurred, normal mode execution continues in step 905. If a checkpoint condition occurs, an initial checkpoint is taken in step 915. Two architectural register files will generally be in use at this time—one for the initial checkpoint, and one to store results corresponding to a "speculative" architectural state (that is, a state which may or may not ultimately become the actual, base architectural state of the processor).

After an initial checkpoint is taken in step 915, the processor begins executing in execute-ahead mode in step 920. Instructions may be either deferred or executed while in execute-ahead mode. For instructions that are executed, results are stored in the current ARF (which represents a possibly speculative state of the processor). In step 925, the processor determines if an additional checkpoint condition has occurred, and if not, it checks it step 927 whether the initial condition has been resolved (e.g., the real outcome of a branch instruction becomes known, or a memory load value becomes known). Upon resolution of the initial condition, the processor will transition from step 927 to deferred execution mode in step 970. Instructions will then be processed from the deferred queue 380 (or other structure), and the processor will eventually return to normal execution mode. Although not shown in FIG. 9, in some embodiments there may be a transition from step 970 back to execute-ahead mode 920 when at least one checkpoint remains active. Returning now to step 927, if the initial condition has not been resolved, execution in execute-ahead mode continues at step 920.

If an additional checkpoint condition is detected in step 925, the processor determines whether there is availability for an additional checkpoint in step 930 (i.e., is there at least one architected register file available and free for use by a given thread?) If space is available, an additional checkpoint is taken in step 935 and execution resumes in execute ahead mode in step 920. If no space is available for an additional checkpoint in step 930 (i.e., all ARFs are in use), then the processor transitions into scouting mode in step 940. Execution proceeds in scouting mode, where results may not be stored in a full copy of the ARF, but may instead be stored in register storage locations 350 (and/or the bypass logic 320).

Thus, while in scouting mode, in-flight instructions being executed by execution pipeline 310 may be able to use the bypass logic to obtain forwarded values from the register storage locations 350, wherein the forwarded values are usable as operands (e.g., memory addresses). Thus in step 945, the use of the bypass logic may allow values to be supplied to the execution pipeline for the calculation of certain memory address operands (that might otherwise be incalculable without bypass forwarding). If, during scouting mode, a memory load address is calculable, the memory load may be executed in step 950 to cause a prefetch of data from memory (or a lower cache level), which is then be stored in cache(s) 330. The results of memory load instructions executed in step 950 (and other scouting mode instructions) are not stored in an architectural register file, but are stored within register storage locations 350 and/or the bypass logic.

Following step 950, the processor checks in step 955 whether the initial checkpoint condition has been resolved. If it has, then deferred execution mode may follow in step 970 (although step 970 may be omitted if no instructions have actually been deferred). If in step 955 it is determined that the initial condition has not been resolved, step 960 seeks to determine if one or more additional conditions have been resolved. If one or more additional conditions (but not the initial condition) have been resolved, the processor may be able to free one or more ARFs (e.g., in structure 340 and/or structure 360), and the processor exits scouting mode to resume execute-ahead mode in step 920.

An exemplary system embodiment is described below.

Figure 10:
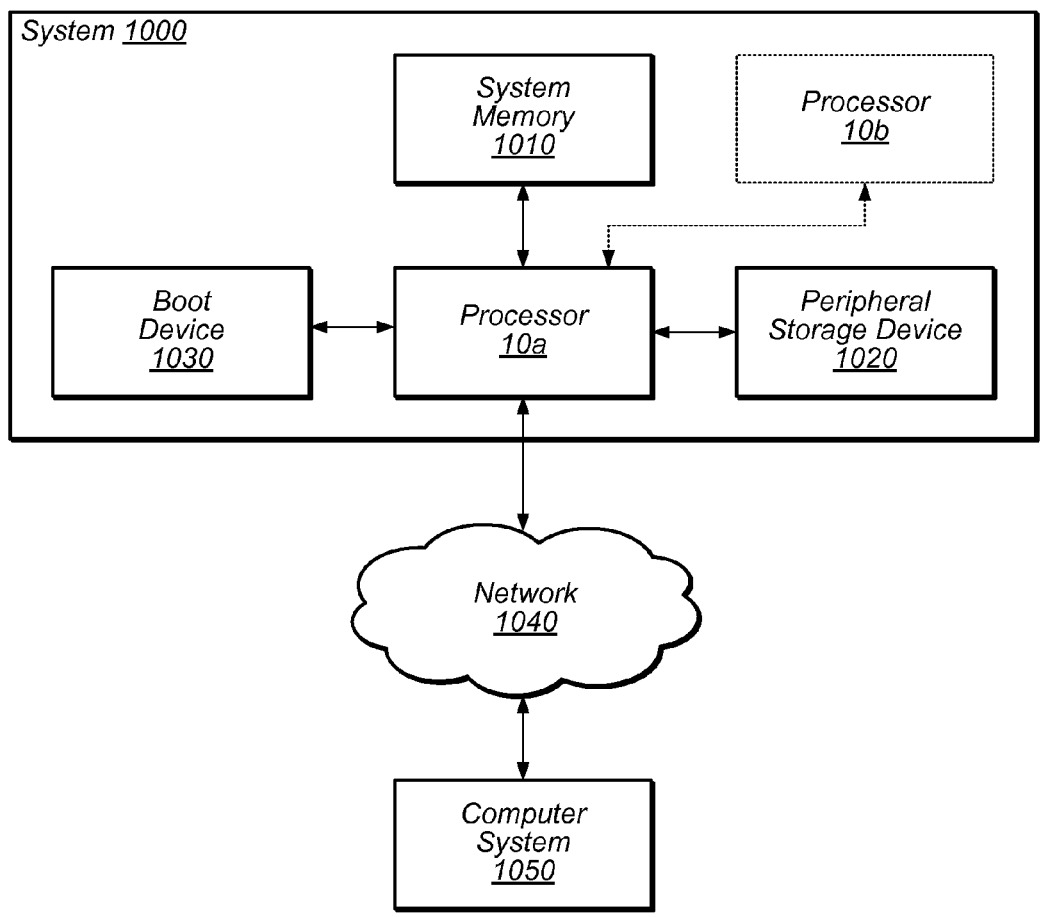
FIG. 10 is a block diagram of an exemplary system embodiment.

As described above, in some embodiments, processor 10 of FIG. 1 may be configured to interface with a number of external devices. One embodiment of a system including processor 10 is illustrated in FIG. 10. In the illustrated embodiment, system 1000 includes an instance of processor 10, shown as processor 10a, that is coupled to a system memory 1010, a peripheral storage device 1020 and a boot device 1030. System 1000 is coupled to a network 1040, which is in turn coupled to another computer system 1050. In some embodiments, system 1000 may include more than one instance of the devices shown. In various embodiments, system 1000 may be configured as a rack-mountable server system, a standalone system, or in any other suitable form factor. In some embodiments, system 1000 may be configured as a client system rather than a server system.

In some embodiments, system 1000 may be configured as a multiprocessor system, in which processor 10a may optionally be coupled to one or more other instances of processor 10, shown in FIG. 10 as processor 10b. For example, processors 10a-b may be coupled to communicate via their respective coherent processor interfaces 140.

In various embodiments, system memory 1010 may comprise any suitable type of system memory as described above, such as FB-DIMM, DDR/DDR2/DDR3/DDR4 SDRAM, or RDRAM®, for example. System memory 1010 may include multiple discrete banks of memory controlled by discrete memory interfaces in embodiments of processor 10 that provide multiple memory interfaces 130. Also, in some embodiments, system memory 1010 may include multiple different types of memory.

Peripheral storage device 1020, in various embodiments, may include support for magnetic, optical, or solid-state storage media such as hard drives, optical disks, nonvolatile RAM devices, etc. In some embodiments, peripheral storage device 1020 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 1020 may be coupled to processor 10 via peripheral interface(s) 150 of FIG. 1.

As described previously, in one embodiment boot device 1030 may include a device such as an FPGA or ASIC configured to coordinate initialization and boot of processor 10, such as from a power-on reset state. Additionally, in some embodiments boot device 1030 may include a secondary computer system configured to allow access to administrative functions such as debug or test modes of processor 10.

Network 1040 may include any suitable devices, media and/or protocol for interconnecting computer systems, such as wired or wireless Ethernet, for example. In various embodiments, network 1040 may include local area networks (LANs), wide area networks (WANs), telecommunication networks, or other suitable types of networks. In some embodiments, computer system 1050 may be similar to or identical in configuration to illustrated system 1000, whereas in other embodiments, computer system 1050 may be substantially differently configured. For example, computer system 1050 may be a server system, a processor-based client system, a stateless "thin" client system, a mobile device, etc. In some embodiments, processor 10 may be configured to communicate with network 1040 via network interface(s) 160 of FIG. 1.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a processor, wherein the processor includes:
 an execution pipeline; and
 one or more sets of checkpoint storage locations configured to store state information associated with up to a maximum of N checkpoints that the processor is configured to take in response to detecting corresponding checkpoint conditions, wherein N is at least one;
wherein the processor is configured, subsequent to detecting a checkpoint condition and having the maximum N checkpoints be in use, to execute additional instructions in scouting mode without using the one or more sets of checkpoint storage locations to store results of the additional instructions, including forwarding values to the execution pipeline to be used as instruction operands during scouting mode.

2. The apparatus of claim 1, further comprising:
a set of register storage locations configured to store values corresponding to the results of the additional instructions; and
bypass logic configured to forward the values that are to be used as instruction operands during scouting mode from the set of register storage locations to the execution pipeline.

3. The apparatus of claim 2, wherein the bypass logic is operational while the additional instructions are executed in scouting mode; and
wherein the set of register storage locations is configured to store the results of the additional instructions until the stored results are overwritten with other results of later-executed instructions.

4. The apparatus of claim 1, wherein the processor is configured to execute instructions in execute-ahead mode subsequent to taking a first of the N checkpoints; and
wherein the processor further comprises a deferred instruction queue configured to store instructions deferred during execute-ahead mode.

5. The apparatus of claim 4, wherein the processor is configured to transition from execute-ahead mode to deferred mode in response to an indication that a first checkpoint condition associated with the first checkpoint is resolved;
wherein deferred mode includes the processor executing instructions stored in the deferred instruction queue.

6. The apparatus of claim 2, wherein the set of register storage locations is a working register file that comprises a plurality of entries, each of which is configured to store information indicative of an architected register, a value for the architected register, and whether the value for the architected register is current.

7. The apparatus of claim 2, wherein the set of register storage locations is within a multi-ported register file that includes a plurality of entries for a corresponding plurality of architected registers;
wherein each of the plurality of entries is configured to store, for that entry's corresponding architected register, a committed value and an active value;
wherein the committed value is a result of an instruction that has been committed, and wherein the active value is a result of an in-flight instruction; and
wherein the processor is configured to forward active values in the multi-ported register file to the execution pipeline via the bypass logic.

8. The apparatus of claim 2, further comprising:
a data cache;
wherein the processor is configured, while in scouting mode, to:
use the forwarded values to determine one or more addresses of one or more memory locations in a memory subsystem; and
cause data to be prefetched from the one or more memory locations and stored in the data cache.

9. The apparatus of claim 1,
wherein the processor is configured to support the maximum N checkpoints for each one of a plurality of threads.

10. A method, comprising:
a processor detecting a checkpoint condition during execution of an instruction stream, wherein subsequent to the checkpoint condition being detected, N sets of N maximum available checkpoint storage locations are being used to store state information associated with N active checkpoints taken by the processor, wherein N is at least one; and
in response to said detecting the checkpoint condition, the processor executing additional instructions of the instruction stream in scouting mode without storing results of the additional instructions in the N maximum available checkpoint storage locations, and including forwarding values to an execution pipeline of the processor be used as instruction operands during scouting mode.

11. The method of claim 10, further comprising:
in response to detecting the checkpoint condition, storing information specifying a state of the processor in an architected register file, wherein the stored state is usable to resume execution at the checkpoint condition, and wherein the architected register file is configured to store results of committed instructions; and
while executing the instruction stream in scouting mode, using results stored in a set of register storage locations as instruction operands for instructions that occur subsequent in the instruction stream to the checkpoint condition, wherein the set of register storage locations is configured to store results of in-flight instructions.

12. The method of claim 10, wherein the checkpoint condition is detected in response to a branch instruction or is taken in response to a memory load instruction resulting in a data cache miss; and
wherein each of the N active checkpoints has a corresponding respective checkpoint condition.

13. The method of claim 10, further comprising the processor, while in scouting mode:
calculating results of a first group of instructions;
storing the results of the first group of instructions in a set of register storage locations; and
while the first group of instructions is in-flight, accessing the stored results to calculate one or more operands specified by a second group of instructions, wherein the one or more operands are memory addresses.

14. The method of claim 13, wherein said accessing the stored results comprises bypass logic forwarding the stored results from a working register file to one or more execution units;
wherein the working register file comprises a plurality of entries, each of which includes information that indicates:
whether that entry is valid;
an architected register associated with that entry; and
a result value of an in-flight instruction specifying the architected register as a destination.

15. The method of claim 13, wherein said accessing the stored results comprises bypass logic forwarding the stored results from an active portion of a register file having an architected portion and from the architected portion;
wherein the architected portion is configured to store results of instructions that have been committed; and
wherein the active portion is configured to store results of instructions that have not yet been committed.

16. An apparatus, comprising:
one or more sets of checkpoint storage locations configured to store information associated with up to a maximum number of N checkpoints taken by the apparatus, wherein N is at least one;
an architected register file configured to store results of committed instructions; and
a set of register storage locations configured to store results of in-flight instructions;

wherein the apparatus is configured, in response to the apparatus detecting a checkpoint condition in association with the one or more sets of checkpoint storage locations being used to store the maximum number of N active checkpoints, to operate in scouting mode, including:

storing, in the architectural register file, information specifying a state of the processor, wherein the stored state is usable to resume execution at the detected checkpoint condition; and forwarding results in the set of register storage locations as operands for instructions that occur subsequent in program order to the checkpoint condition, wherein results of the instructions that occur subsequent in program order to the checkpoint condition are not stored in the one or more sets of checkpoint storage locations.

17. The apparatus of claim 16, further comprising:
a deferred instruction queue;
wherein the apparatus is configured to operate in execute-ahead mode in response to at least one checkpoint being active, but less than N-1 checkpoints being active; and
wherein, while in execute-ahead mode, the apparatus is configured to defer completion of instructions that require results of instructions associated with the additional checkpoint condition, wherein deferring completion of those instructions includes storing instructions in the deferred instruction queue; and
wherein the apparatus is configured to operate in deferred mode in response to an indication that at least one checkpoint is no longer necessary, wherein deferred mode operation includes executing instructions stored in the deferred instruction queue.

18. The apparatus of claim 16, wherein the set of register storage locations comprises a working register file configured to store a plurality of result values for a plurality of in-flight instructions; and
wherein the apparatus further comprises a bypass logic network configured to forward values from the working register file to one or more execution units, wherein the forwarded values are usable as operands by other instructions requiring the results of the plurality of in-flight instructions.

19. The apparatus of claim 16, wherein the set of register storage locations comprises an active portion of a register file that also has an architected portion, wherein the architected portion is configured to store results of instructions that have been committed, and wherein the active portion is configured to store results of in-flight instructions; and
a bypass logic network configured to forward values from the active portion of the register file to one or more execution units, wherein the forwarded values are usable as operands by other instructions requiring the results of the in-flight instructions.

20. The apparatus of claim 17, wherein the apparatus is configured to:
use a first thread to execute instructions from the deferred queue; and
use a second thread to execute other instructions.

* * * * *